May 5, 1970  A. C. PECK ET AL  3,510,341

METHOD FOR GLOSSING LABELS

Filed Nov. 21, 1966

INVENTOR.
ARTHUR C. PECK
ALEXANDER J. USKO
BY

James C. Sogomasini
ATTORNEY:

3,510,341
METHOD FOR GLOSSING LABELS
Arthur C. Peck, Hazardville, and Alexander J. Usko, Wapping, Conn., assignors to Monsanto Company, St. Louis, Mo., a corporation of Delaware
Filed Nov. 21, 1966, Ser. No. 595,796
Int. Cl. B41m 5/24; B44c 1/097; C23c 7/00
U.S. Cl. 117—46                                2 Claims

ABSTRACT OF THE DISCLOSURE

This invention is directed toward glossing the surface of wax release decals on plastic containers by shock melting the wax without appreciably raising the temperature of the plastic, in order to smooth the wax, followed by immediate shock chilling of the heated surface to maintain the gloss.

---

This invention relates to article decorating, and more specifically to the finished appearance of decorated plastic articles.

Conventional wax release decals for article decorating consist of a wax coated paper base on which the decoration is gravure printed, and over which in turn an adhesive covering or bonding agent is applied. In affixing the decal to an article, the adhesive covering finishes up in contact with the container surface, with the wax coating on the outside away from the surface. The decal thus applied is in a dull unfinished condition and on close examination is seen to have a rippled surface.

It has been conventional, therefore, to cure or gloss decals so applied by slow passage of the labeled article through a long, multi-compartmented oven maintained at about 170°–500° F. to melt and smooth the wax, followed by exposure to a forced ambient air cooling zone. When the article on which the decals are applied is plastic, the long retention time in the oven tends to soften and distort the plastic material. Should the articles be bottles, for example, and one or more being conveyed through the oven tip or fall on their side, a general jamming of the oven interior will occur. If the blockage is not immediately corrected, the plastic naturally will increase in temperature, soften and fuse to an adjacent container on contacting it, thus causing considerable rejects and wasted operating time. The long closed oven generally occupies considerable valuable space and furthermore, in view of the abovementioned problems with plastic bottles, it has been very difficult to maintain consistent optimum oven operating conditions, i.e., temperature, air velocity, retention time. The complexity of such a curing system generally has resulted in sporadic operation.

In recognition of this problem, the present invention is directed toward provision of an extremely simplified system for glossing waxed decals.

Accordingly, it is the principal object of the present invention to provide an improved method for glossing the waxed surface of wax release decals applied to plastic articles.

It is an additional object of the present invention to provide a method for curing the bonding agent utilized to adhere a wax release decal to an article surface, simultaneously with the glossing of the waxed surface.

It is a further object of the present invention to provide a method for curing waxed decals on thermoplastic containers, wherein the operating conditions may generally be maintained constant regardless of the type of thermoplastic utilized.

It is a still further object of the present invention to provide an improved method for consistently glossing waxed decals on low density polyethylene containers.

Other objects of this invention will in part be obvious and will in part appear hereinafter.

These and other objects are accomplished by providing a method for curing waxed labels on plastic articles by subjecting the label to a source of heat sufficient to instantaneously melt, level and gloss the wax without appreciably raising the temperature of the plastic, and when immediately thereafter shock chilling the treated surface to maintain the gloss.

In describing the overall invention, reference will be made to the preferred embodiment illustrated in the accompanying drawings in which.

Figure 1:
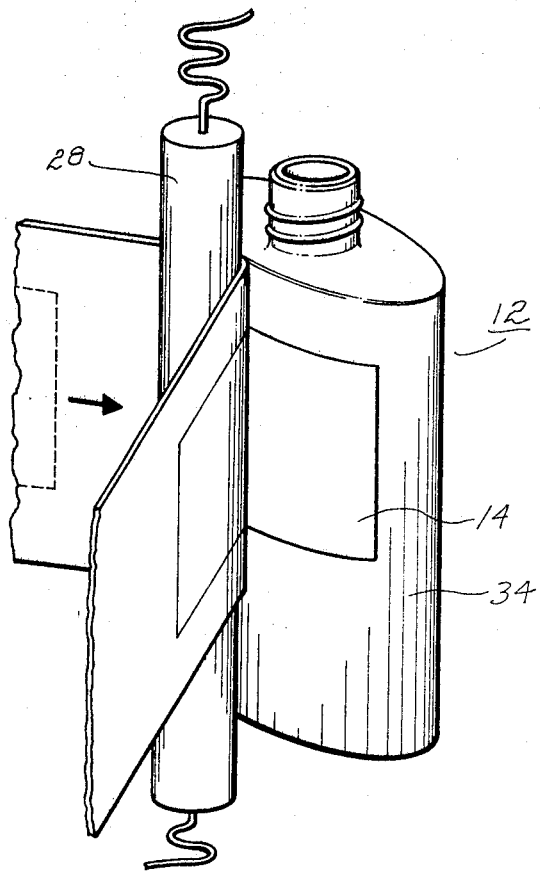
FIG. 1 is a schematic perspective view illustrating a typical method of applying a waxed decal to a plastic article.

With reference to the drawings, wherein identical numbers refer to identical parts, there is shown in FIG. 1 a heated roller 28 applying the adhesive side of decal 14 to surface 34 of plastic bottle 12 in a conventional manner leaving wax bearing decal 14 on the outside.

Figure 2:
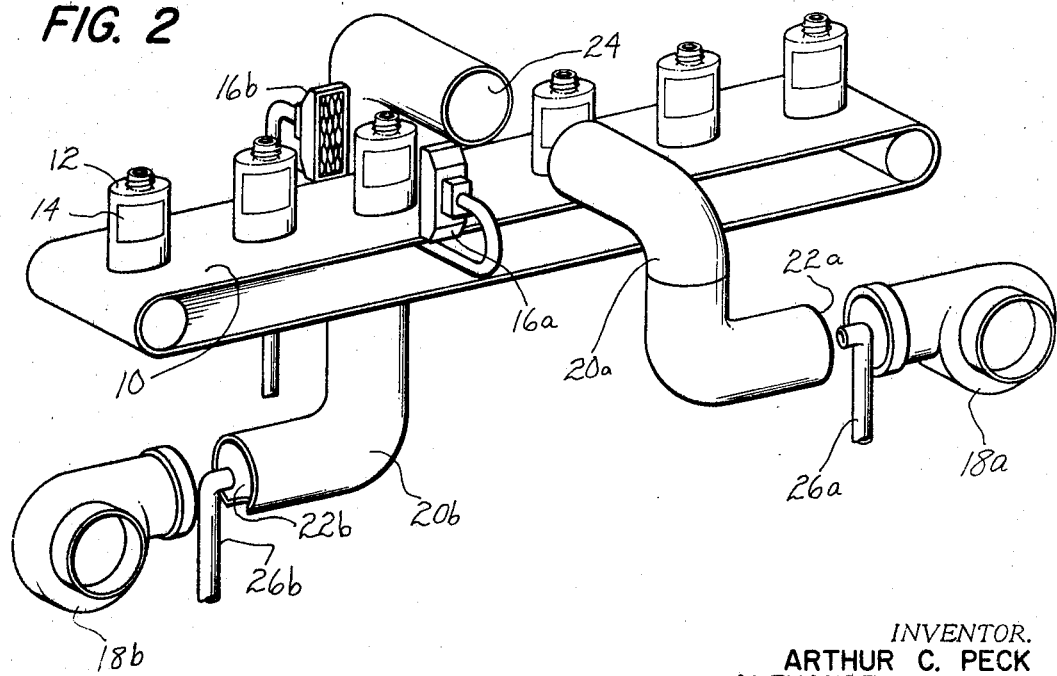
FIG. 2 is a schematic perspective view of the method of heating and chilling of the present invention.

In FIG. 2 is shown a conveyor 10 for transporting the bottles shown typically as 12 on which wax decals 14 have been applied. Adjustable ribbon gas burners 16 are mounted adjacent each side of conveyor 10. Dual fans 18 blow air through ducts 20. Each duct 20 has an inlet 22 adjacent the discharge end of fan 18, and an opposite exit end 24 mounted adjacent the conveyor downstream of ribbon gas burners 16. Mounted within the entrance end 22 of duct 20 are one or more fog nozzles 26 for humidifying the air blown by fans 18.

After application of the outer adhesive portion of wax decals 14 to the bottle surface 34 as shown typically in FIG. 1, the bottles are placed on conveyor 10 and moved at approximately 25 to 40 feet per minute through the high temperature flame produced by ribbon gas burners 16. During exposure to the flame, the wax on the surface of the decal is melted, and any wax ripples or uneven spots previously thereon are leveled, resulting in a highly glossed decal surface. The glossed effect is a result of light reflecting in an organized manner from the smooth surface. After passage through the flame, the decal is then immediately exposed to the humidified air leaving exit end 24 of duct 20 to rapidly shock chill the heated wax and thereby maintain the gloss previously obtained on exposure to the high temperature.

After the shock chilling produced by the humidified air, the bottles are removed from the exit end of the conveyor by conventional means.

The above description and particularly the drawings are set forth for the purposes of illustration only and are not in any way to be taken in a limited sense.

As mentioned previously, the invention is directed toward an improved method and apparatus for curing waxed decals applied to plastic articles comprising the steps of shock heating the wax on the decal surface to melt, level and gloss the wax, and then rapidly shock chilling the waxed surface to maintain the gloss.

Decal application may be accomplished by any conventional method which would in effect intimately contact the adhesive side of the waxed decal with the container surface.

The decals used in the present invention are of the wax release, reverse image type. They are usually prepared by applying wax to a paper roll, followed by printing of the particular design on the wax, and finally coating with a bonding agent which is usually a lacquer. Decal as herein used includes the waxed surface, decorative printing and bonding agent. A protective covering for the decorative print is sometimes utilized, and it is intended that this be included as part of the decal when it is used. Currently known commercial decals which are typical of the type applicable to the present invention are those bearing the trade name "Therimage" manufactured by the Dennison Company and "Di-Na-cal" by the Diamond National Company.

The present invention is concerned with substrates of any material, particularly with plastic substrates and most particularly with thermoplastic substrates such as polystyrene, polyethylene, polypropylene and polymers of vinyl chloride. It is especially applicable to thermoplastic materials which tend to soften and lose shape on exposure to heat over extended periods. Most preferred container substrates are low density polyethylene and polyvinyl chloride. Heretofore, there could be no guaranty of a practical and consistently obtained glossed decal on a low density polyethylene surface, but by means of the present invention this has now been made possible.

It is essential in the practice of the present invention that the waxed decal surface be chilled immediately after the heating step to freeze the wax molecules in the leveled, glossed state. Experience has shown that if the chilling step is eliminated or postponed and the hot, melted wax allowed to cool slowly, a dull, hazy appearance occurs.

Though it is not desired to be limited by the following explanation as to the reason for this, it is felt that there is a temperature range within which the wax molecules crystallize to provide a dull hazy appearance if the wax temperature is held therein for any appreciable time period. This range can be referred to as the wax crystallization temperature range. When the wax is exposed to temperatures appreciably above this crystallization temperature range, as in the present invention, the wax flow which provides the gloss occurs immediately, i.e., within a fraction of a second. If the leveled, hot, glossed wax is then immediately shock chilled, it is as if the wax does not have time to crystallize as it passes through the crystallization temperature range, and the glossed surface is therefore maintained. Under slower cooling conditions, however, or anything short of immediate chilling, crystallization will occur as the wax temperature passes through the crystallization temperature range and a hazy, dull appearance will result. The crystallization temperature range for waxes generally used in wax release reverse image decals is generally between about 190 to 250° F. For purposes of the present invention, the shock chilling step may be satisfactorily carried out if the heated waxed surface is shock chilled at least before its temperature reaches the upper limit of the crystallization temperature range.

For a similar reason, it is important to minimize the heat aborbed by the substrate on which the label is applied during the heating step. It is preferred to confine heat added to the substrate at most, only to the surface thereof. If appreciable heat is added into the substrate cross section, the residual heat may raise the temperature of the chilled wax somewhat once again, or it may not be completely cooled, causing the wax to become dull and hazy.

Any type of concentrated heat which can be focused on the wax molecules of the decal surface rather than on the complete article may be utilized to rapidly melt and smooth the wax. Based on simplicity, the preferred method is by flame. Other methods either direct or indirect may be utilized such as radiant heating, convection, electrical resistance or infrared heating and the like. Naturally, the more complicated the heating means, the more impaired is the simplicity of the system. Obviously, when applying a decal to only one side of an article only one heating and chilling system is necessary.

The shock chilling step of the present invention may be accomplished by evenly contacting the hot melted wax surface of the decal with any material having a relatively high heat capacity. Cold water, for example, has been successfully used in the past. Because of ease of operation and simplicity of apparatus the preferred method is by use of a gas which basically serves as a carrier for a liquid or solid dispersed therein with a relatively high heat capacity, the latter acting as the heat transfer agent to cool the wax. Any gas and any material dispersable therein with these qualifications would be suitable in the present invention. For example, a $CO_2$ fire extinguisher has been used successfully in the past. Air with liquid water physically entrained therein is the preferred shock chilling medium, however, because the added moisture has a greater heat removal capacity. Another advantage to a liquid dispersed in gas system is that when water or a similar liquid is used, a large part of the chilling of the wax is provided by the heat of vaporization of the liquid supplied by the hot wax surface, plus any residual heat in the immediate area of the article adjacent the decal. It is preferable that the air contain as much moisture as can be carried without causing water droplets to form on the waxed surface. Such water spots give a mottled uneven finish. The air should bear between about 0.0007 to 2 pounds of liquid water per pound of air and preferably about 0.007 pound of water per pound of air. The air temperature may be varied between about 0 to 120° F. and preferably from 30 to 90° F.

As an alternative to humidified air, nonhumidified refrigerated air may be utilized but its temperature must be considerably lower to compensate for the loss of heat removal capacity of the water in the humidified air.

Though velocity may be determined somewhat by the temperature, 25 to 40 feet per minute through the chilling zone has been found to be most suitable in the present invention. When the articles are bottles, generally the maximum velocity which does not knock over the bottle is preferred. Retention time of the label in the chilling medium is generally in the order of 1 to 2 seconds. If the humidifying water or air contains substantial impurities, a filter for each, or a single filter for the humidified air may be necessary to avoid deposition of the impurities on the glossed surface. Likewise, it may be desirable to soften the water if it has a high mineral content, otherwise a scum may be deposited on the decal.

The present invention is directed toward curing of waxed decals applied to all types of articles, particularly to containers and most particularly to oblong or oval shaped bottles. In curing decals applied to cylindrical containers or bottles, means for rotating the bottle to insure uniform and complete exposure of the waxed surface to the flame may be necessary. For example, an indexing turret could be used to grip the bottles, lower them into the flame and rotate them therein to insure uniform exposure followed by removal from contact with the flame.

The temperature of the heating medium necessary for the heating step of the present invention is at least that sufficient to instantaneously melt the wax and for most waxes within the scope of the present invention, this range is between about 2000° F. to about 2300° F. However, heating medium temperatures as high as 5000° F. to 6000° F. have been utilized in obtaining satisfactory results. Temperatures higher than this level tend to break down or decompose the wax, leaving an undesirable film on the surface, and even though retention time within the flame is extremely short, the article usually becomes distorted, especially low density polyethylene. Exposure time of the waxed surface to the heating medium, temperature of the heating medium and substrate material are all interrelated and may vary within wide limits, and provide an acceptable glossed surface. For polyvinyl chloride and low density polyethylene substrates, and flame temperatures of about 2000–2300° F., exposure time of the waxed surface should be between about 0.1 to about 2 seconds and preferably at about 0.5 second.

As a preferred embodiment of the present invention, the process described herein may be used to melt and level the lacquer bonding agent for adhering the decal to the substrate, simultaneous with the melting of the waxed surface of the decal. If the lacquer bonding agent of the decal is uneven or rippled after the decal has been applied to the article substrate, this also has an effect on the glossed appearance of the surface. For optimum gloss therefore, both the waxed decal surface and lacquer bonding agent should be heated and shock cooled. The operating conditions mentioned previously will adequately accomplish this effect.

The present invention is extremely effective for wax release, decals applied to all types of plastic articles such as containers, sheet, and film to present a package exhibiting high gloss and an attractive appearance. This is particularly important in today's extremely competitive market, wherein the effect of having a decal bearing a bright name to catch the eye of a potential customer is of unquestioned advantage. Heretofore, such results were unattainable with relatively soft thermoplastic containers such as low density polyethylene but, with the method of the present invention, these results may now be consistently obtained.

The apparatus described is mechanically simple, provides immediate results, uses a minimum of valuable space, improves procces yield, provides improved economy, and is especially suited for use with thermoplastic containers. Furthermore, setup time is minimized and operating conditions are easily controlled. Because of the extremely low exposure time to the heating medium and the focusing of the heating medium primarily on the waxed decal surface, operating conditions in terms of temperature and exposure time may generally be maintained constant and independent of the type of plastic being decorated.

Various modifications and alterations will be readily suggested to persons skilled in the art. It is intended, therefore, that the foregoing be considered as exemplary only, and that the scope of the invention be ascertained from the following claims.

What is claimed is:
1. A method of decorating a container made of a synthetic resinous thermoplastic material comprising the steps of:
 (a) applying a wax release, heat transfer decal to a surface of the container, said decal application having a nonglossy waxed outer surface;
 (b) subjecting the decal to a source of heat at a temperature of between 2000° F. to 6000° F. to instantaneously melt the wax while keeping the temperature of the container below the softening point of the thermoplastic; and
 (c) immediately and rapidly shock chilling the melted wax to gloss the decal by exposure to air at a temperature of between about 0 to 120° F., said air having about 0.0007 to 2 pounds of water per pound of air dispersed therein, whereby the heat of the wax is rapidly extracted by vaporization of the water to set and gloss the wax without leaving any substantial liquid on the glossed surface.
2. The method of claim 1 wherein the heat is applied by means of a flame.

References Cited

UNITED STATES PATENTS

| | | | |
|---|---|---|---|
| Re. 25,792 | 6/1965 | Labombarde. | |
| 273,013 | 2/1883 | Bedford | 117—119.2 |
| 1,538,388 | 5/1925 | Dostal | 156—280 XR |
| 2,274,284 | 2/1942 | Vore | 117—119.2 |
| 2,721,821 | 10/1955 | Hoover | 117—3.2 XR |
| 2,862,832 | 12/1958 | Shepherd | 117—3.2 |

DAVID KLEIN, Primary Examiner

U.S. Cl. X.R.

117—119.2; 118—47; 156—230, 238, 497